Nov. 18, 1969   D. C. CONNER   3,478,466
MAGNETICALLY ACTUATED TOY DEVICE
Filed Dec. 17, 1968

INVENTOR
DAVID C. CONNER

ATTORNEY

United States Patent Office 3,478,466
Patented Nov. 18, 1969

3,478,466
MAGNETICALLY ACTUATED TOY DEVICE
David C. Conner, Dallas, Tex., assignor to Rathcon, Inc., Dallas, Tex., a corporation of Texas
Filed Dec. 17, 1968, Ser. No. 784,302
Int. Cl. A63h 33/26
U.S. Cl. 46—236         10 Claims

ABSTRACT OF THE DISCLOSURE

A magnetically actuated toy device wherein a plurality of magnets are positioned on a base in a desired pattern. A rigid pendulum element is supported at one end for universal movement and has a magnet at the other end. The movement of the pendulum is determined by the interaction of the magnetic field of the magnet connected to the free end of the pendulum and the magnetic field of magnets positioned on the base.

---

Figure 1:
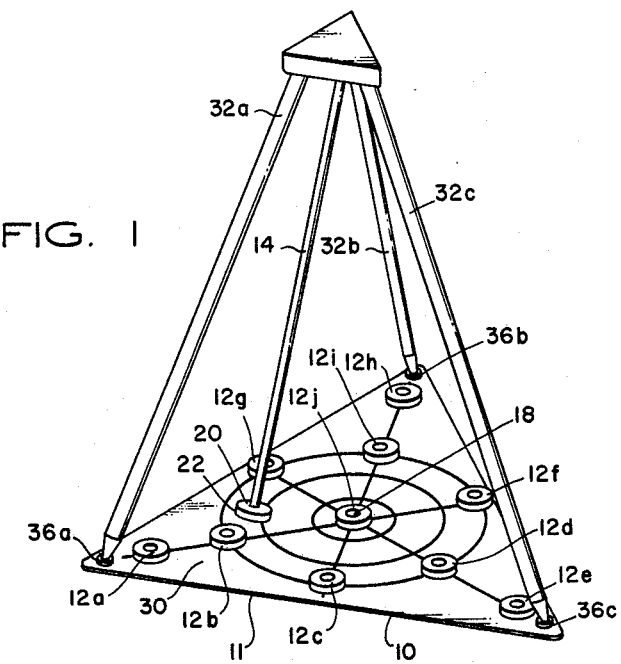

A class of amusement device which has been accorded a certain degree of recognition is one in which a body or element is caused to move in accordance with various natural laws or phenomena. The movement of the element is generally in patterns which are both interesting to observe and relaxing.

The present invention provides an improvement amusement device of this general type. In accordance with the present invention, there is provided a base, suitably one having lines provided thereon for indicating the concentricity thereof or locus of various points from a center point. There is also provided a pendulum member and means for supporting the pendulum member above the center point. A plurality of magnetic members are placed on the surface of the base member, with the lines formed on the base member functioning to aid in positioning the magnetic members relative to the center point in order to produce a desired pattern of magnetic fields. An additional magnetic member is attached to the lower end of the pendulum member. Once the pendulum is caused to commence movement, the interaction between the additional magnetic member and the other magnetic members will cause it to move for a substantial period of time with the pattern of movement being determined by the arrangement of the magnetic field. It will be appreciated that by arranging certain of the magnetic members on the base to attract the additional magnetic member and others to repel the magnetic members, extremely complex magnetic fields can be generated producing very interesting movements of the pendulum.

Figure 2:
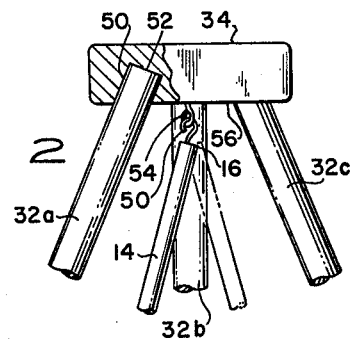
Figure 3:
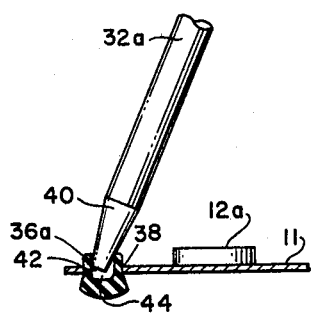

Many objects and advantages of the invention will become apparent to those skilled in the art as a detailed description of the invention unfolds in conjunction with the appended drawing wherein like reference numerals to note like parts and in which:

FIGURE 1 is a prospective view showing the amusement device in accordance with the preferred embodiment of the present invention;

FIGURE 2 is a side elevation view, partially in cross-section, showing the preferred manner for suspending the pendulum member provided in FIGURE 1 and for supporting the pendulum member above the center point; and FIGURE 3 is a view, partially in cross-section, illustrating the manner in which the base element is supported and connected to the individual legs of the tripod supporting the pendulum member.

The amusement device in accordance with the present invention is designated generally by the reference character 10. It includes a base 11, which is suitably of triangular configuration, as shown, but which may be of any desired shape. There is also provided a plurality of magnetic members 12a–12i. It will be appreciated that any desired number of magnetic members can be utilized, but in this specific example of the invention, ten are disclosed.

There is also provided a pendulum member 14 and means for supporting the pendulum member by one end 16 above a center point 18 on the base member 10, with the other end 20 being free. An additional magnetic member 22 is carried by the other end 20 as shown. It is preferred that the magnets be of planar construction, as shown, with opposite poles lying in opposite faces thereof. As a result of interaction between the magnetic field of the magnet 22 with the complex magnetic field produced by the magnets 12a–12i, in combination with the force of gravity acting on the pendulum, the pendulum 14 will be caused to move in very interesting and unexpected patterns after swinging is initiated by displacing the magnet from an at rest position, traversing almost all types of paths. Eventually, the magnet 22 will be aligned opposite a magnet whose side up is of opposite polarity to the underside of magnet 22 or be centered in a position between magnets of like polarity.

In accordance with the preferred embodiment of the invention, base 11 is of ferrous material, or at least the upper surface of a portion of the base on which the magnets 12a–12i will be placed is of ferrous material in order that the magnet will be attracted to the upper surface and held in a desired position even though two magnets which are poled in a similar manner may be placed adjacent to one another. It will be noted that if the upper surface 30 of the base member 11 is smooth and of non-ferrous material, it would not be possible to obtain such a spacial relationship.

The preferred structure for supporting the pendulum member 14 is a tripod structure comprising legs 32a–32c along with a connecting member 34 and grommets 36a–36c. One of the grommets, 36a, is shown in FIGURE 3 of the drawing and can be seen to extend through a hole 38 formed in the base 11. Grommet 36a therefore functions to provide a foot for supporting the base 11 above a supporting surface, such as a table. The leg 32a is bevelled at its lower end 40 with the tip 42 thereof extending into the cavity 44 formed in the grommet. The lower end 42 of the leg 32a is therefore positioned in known relationship to the center point 18. Grommets 36b and 36c have a similar relationship to base 11 and legs 32b and 32c.

The member 34 is provided with three cavities 50 aligned to receive the end 52 of each of the legs 32a–32c. An eye member 54 is affixed to the lower surface 56 of the member 34 at a point such that the eye member 54 will be directly above the center point 18 when the legs 32a–32c are connected to the member 34 as shown and the ends 42 of each of the leg members is inserted into a cavity 44 of each of the grommets. A hook member 58 extends from the end 16 of the member 14 with the hook member being substantially coaxial with the pendulum member 14. When the hook 58 engages the eye 54 as shown, a relatively simple but substantially friction-free universal joint is provided which permits movement of the pendulum member 14 in any desired direction for a reasonable excursion of the pendulum member 14 from the center point 18. The particular supporting structure described above is preferred in that it has been found to provide a very stable and accurate positioning of the pendulum 14 relative to the center point 18, but yet is readily assembled and disassembled permitting the device to be packaged in a flat container.

It will be appreciated that like poles of two magnets in close proximity repel whereas unlike poles will attract. The most interesting results can be obtained by structuring the composite magnetic fields of magnets both like and dislike the pole of the magnet on the pendulum 14. Accordingly, it is preferred that the pole of the underside of the magnet 22 be identified, preferably by being painted one color and that the like pole of each of the magnets 12a–12i also be of a like color. The opposite pole of each of the magnets is preferably of a contrasting color, or each of the magnets could have its opposite pole a different, contrasting color in order that a particular magnet whose unlike pole is up can readily be identified. Means other than colors can be used for identification of the poles of the magnets. Identification of the poles of the magnets is not required, however, and is undesirable in some instances.

As mentioned previously, the interesting movement of the pendulum 14 is produced as a result of interaction of the magnetic field of the magnet 22 with the magnetic fields of the magnet 12a–12i in combination with the force of gravity acting on the pendulum. It will be appreciated that the magnets 12a–12i can be arranged in many different patterns, some of which will require a lesser or greater number than shown. Lines 60 can be provided for guiding the arrangement of the magnets on the base relative to the center point 18. It has been found that, in general, best results are obtained when the arrangement of the magnets is concentric with respect to the center point 18. In the specific arrangement shown in FIGURE 1 of the drawings, it is preferred that magnets 12a, 12c, 12h and 12j be positioned on the base 11 with their one pole up, and magnet 22 with the one pole down. Accordingly, magnet 22 will be repelled away from each of these magnets. The remaining magnets are positioned on the base with their other pole up. Accordingly, the remaining magnets will tend to attract the magnet 22. Since the magnet 12j is positioned to repel magnet 22, the pendulum member 14 will never come to rest with the pendulum hanging in a vertical position directly over the center point 18, rather, after a period of time, the pendulum 14 will come to rest in line with one of the magnets whose other pole is up such as the magnet 12b of FIGURE 1.

Although the invention has been described with reference to a particular preferred embodiment, many changes and modifications will become apparent to those skilled in the art in view of the foregoing descriptions which are intended to be illustrative and not limiting the invention defined in the appended claims.

What I claim is:

1. A magnetically actuated toy device comprising:
 (a) a base having an area of play;
 (b) a plurality of magnets positioned on the area of play in a selected pattern;
 (c) a pendulum including a separate magnet positioned at one end of the pendulum;
 (d) support means suspending said pendulum by its opposite end at a first point above the area of play for pivotal movement of the pendulum about the first point above the area of play and the plurality of magnets; and
 (e) complex magnetic field means produced by said plurality of magnets which interacts with a magnetic field produced by the separate magnet to produce in combination with the force of gravity acting on said pendulum directionally random swinging movement of the pendulum for substantial periods of time after swinging is initiated by displacing the pendulum from an at rest position;
 (f) each of the plurality of magnets being moveable to different locations on the area of play and removable from the area of play to vary the character of the complex magnetic field produced by the plurality of magnets and produce different random swinging movements of the pendulum.

2. A magnetically actuated toy device comprising:
 (a) a base having an area of play;
 (b) a plurality of magnets positionable on the area of play in selected patterns;
 (c) each of said plurality of magnets being of planar construction with its poles lying in opposite faces thereof;
 (d) a pendulum having a separate magnet of planar construction attached at one end; and,
 (e) means for suspending said pendulum by its opposite end at a first point above the area of play with one pole of the separate magnet in opposed relationship to said base when the pendulum is at a rest position and in spacial relationship to the plurality of magnets when said plurality of magnets are positioned on the area of play to permit swinging movement of the pendulum above the area of play in sufficiently close proximity to the plurality of magnets that movements of the pendulum across the area of play are influenced by the interaction of the magnetic field of the plurality of magnets with the magnetic field of the separate magnet.

3. A toy device as defined in claim 2 including guide means formed on the upper surface of said base relative to a center point aligned vertically with said first point for guiding the arrangement of said plurality of positionable magnets on said base.

4. A toy device as defined in claim 2 wherein at least a portion of said base is of ferrous material, said plurality of positionable magnets being positioned on said portion of ferrous material.

5. A toy device as defined in claim 2 wherein said base is shaped to define an equilateral triangle and is of ferrous material.

6. A toy device as defined in claim 2 wherein said means for suspending includes a tripod supporting an eye at a fixed point above the base and a hook connected to said pendulum and engageable with said eye.

7. A toy device as defined in claim 6 including means for positioning said tripod relative to a center point on said base.

8. A toy device as defined in claim 2 wherein a substantial portion of said pendulum is rigid.

9. A toy device as defined in claim 2 wherein said pendulum is a rigid rod.

10. A top device as defined in claim 2 including means for identifying each pole of each magnet.

References Cited
UNITED STATES PATENTS

| 3,118,669 | 1/1964 | Merrill | 273—1 |
| 3,307,850 | 3/1967 | Thomas | 273—1 X |
| 3,312,470 | 4/1967 | Ames | 273—1 X |

F. BARRY SHAY, Primary Examiner

ROBERT F. CUTTING, Assistant Examiner

U.S. Cl. X.R.

273—1